United States Patent
Galazin

(10) Patent No.: US 7,210,692 B2
(45) Date of Patent: May 1, 2007

(54) TRAILING BEAM SUSPENSION WITH ALIGNMENT ADJUSTMENT

(75) Inventor: Gregory T. Galazin, Muskegon, MI (US)

(73) Assignee: The Holland Group, Inc., Holland, MI (US)

( * ) Notice: Subject to any disclaimer, the term of this patent is extended or adjusted under 35 U.S.C. 154(b) by 257 days.

(21) Appl. No.: 10/476,914

(22) PCT Filed: May 3, 2002

(86) PCT No.: PCT/US02/13974

§ 371 (c)(1),
(2), (4) Date: Apr. 15, 2004

(87) PCT Pub. No.: WO02/090170

PCT Pub. Date: Nov. 14, 2002

(65) Prior Publication Data

US 2005/0023790 A1    Feb. 3, 2005

Related U.S. Application Data

(60) Provisional application No. 60/288,935, filed on May 4, 2001.

(51) Int. Cl.
*B60G 7/02*    (2006.01)
(52) U.S. Cl. ............................... 280/86.75; 280/124.1; 280/124.11; 280/124.116

(58) Field of Classification Search ............. 280/86.75, 280/124.128, 124.116, 124.11, 5.5, 124.1
See application file for complete search history.

(56) References Cited

U.S. PATENT DOCUMENTS 5,683,098 A   11/1997   VanDenberg
6,182,984 B1 *  2/2001   Chalin ................... 280/86.751

FOREIGN PATENT DOCUMENTS

DE    8716234.2   *   3/1988
EP    0 943 529 A1    9/1999
EP    0 950 602 A2    10/1999

* cited by examiner

*Primary Examiner*—Eric Culbreth
(74) *Attorney, Agent, or Firm*—Price, Heneveld, Cooper, DeWitt & Litton, LLP

(57) ABSTRACT

A trailing beam suspension includes a mechanical adjustment mechanism for aligning the axle and wheels of a vehicle. The trailing beam is mounted to the vehicle frame by a pivot bolt passing through a hanger bracket and a conventional bushed connection. Opposing sides of the hanger bracket contain aligned curved apertures that receive the pivot bolt. The pivot bolt passes through pivot arms which are pivotally connected to the sides of the hanger bracket. The pivot arms are connected to a yoke to which an adjustment shaft is attached. Movement of the adjustment shaft moves the yoke fore and aft. The movement of the yoke pivots the pivot arms, thus moving the pivot bolt in a fore-and aft-direction. When the trailing beam has been aligned, the pivot connection is tightened, thus securing the trailing beam, axle, and wheels in the desired alignment.

8 Claims, 9 Drawing Sheets

TRAILING BEAM SUSPENSION WITH ALIGNMENT ADJUSTMENT

CROSS-REFERENCE TO RELATED APPLICATION

Priority under 35 U.S.C. §119 is claimed to Patent Cooperation Treaty Patent Application No. PCT/US02/13974, filed May 3, 2002, entitled TRAILING BEAM SUSPENSION WITH ALIGNMENT ADJUSTMENT, and under 35 U.S.C. §120 to U.S. Provisional Patent Application No. 60/288,935, filed May 4, 2001, entitled TRAILING BEAM SUSPENSION WITH ALIGNMENT ADJUSTMENT, the entire disclosures of which are incorporated herein by reference.

BACKGROUND OF THE INVENTION

1. Technical Field

The invention relates to vehicle suspensions. In one aspect, the invention relates to a trailing beam suspension for a wheeled vehicle in which the suspension includes a mechanism for fore or aft adjustment of the alignment of the axle and wheels with respect to the longitudinal axis of the vehicle.

2. Related Art

Proper wheel alignment in road vehicles is important to prevent undue tire wear. Common causes of improper wheel alignment include improper initial suspension system installation, accident damage, and impact or shock loads imposed on suspension components by potholes or other irregularities in the road.

Wheel alignment adjustment mechanisms permit adjustment of the alignment of vehicle axles and wheels with respect to the vehicle frame. Adjustment mechanisms are generally one of two types: (1) those that are adjustable as the suspension is installed on the vehicle and then permanently fixed in the adjusted position by welding or the like, and (2) those that are adjustable any time during and after installation and are held in the adjusted position mechanically.

U.S. Pat. No. 3,960,388 to Strader et al., which is incorporated herein in its entirety by reference, is an example of the first category of alignment devices. The Strader '388 patent discloses a trailing beam suspension that incorporates a mounting plate for the trailing beam having a pair of bosses that engage slots in the hanger bracket. The trailing beam is attached to the hanger bracket by a bolted connection in which the bolt passes through the mounting plate and is secured with a nut. The bolt head engages the mounting plate so that rotating the bolt pivots the mounting plate about one of the bosses. Pivoting of the mounting plate moves the bolt fore or aft, which moves the trailing beam fore or aft to align the axle. When the axle and wheels have been properly aligned, the plate is welded to the hanger bracket. Further adjustment is possible only after removing the weld.

U.S. Pat. No. Re. 30,308 to Masser discloses a trailing beam suspension system incorporating a mounting plate for the trailing beam having a single boss that engages a slot in the hanger bracket. The pivot bolt for the trailing beam passes through the mounting plate and slot. The trailing beam is moved fore or aft until proper alignment of the axle and wheels is achieved. The mounting plate is then welded to the hanger bracket. Further adjustment is possible only after removing the weld.

U.S. Pat. No. 4,991,872 to Richardson discloses a trailing beam suspension for a low-bed trailer. The forward trailing beam of a pair of trailing beams is mounted to the intermediate, inclined portion of the trailer's main structural beam through a bushing assembly. The bushing assembly is held to the web of the beam by a bolted connection. The web is provided with slotted mounting holes that enable adjustment of the alignment of the trailing beam and attached axle. The trailing beam is moved fore or aft until the axle and wheels are properly aligned. After adjustment, the bushing assembly is welded to the beam. Further adjustment requires removal of the weld and loosening of four bolts connecting the bushing assembly to the trailer beam.

An example of the second category of alignment devices is disclosed in U.S. Pat. No. 5,201,898 to Pierce. The Pierce '898 patent discloses a trailing beam suspension incorporating a pair of complementary discs that engage each other with a channel and rib arrangement, with the trailing beam mounting bolt passing therethrough. One disc is welded to the hanger bracket and incorporates an asymmetrical hole. The second disc contains an off-center hole and is rotatable relative to the first. The rotation of the second disc relative to the first is translated into lateral movement of the trailing beam mounting bolt. It is necessary to restrain the second disc against further rotation while the connection is tightened to prevent movement of the trailing beam from its aligned position.

SUMMARY OF THE INVENTION

According to the invention, a trailing beam suspension for a vehicle comprises a hanger bracket adapted to be mounted to a vehicle frame rail, a trailing beam pivotally mounted at one end to the hanger bracket through a pivot pin and an adjustment slot in the hanger bracket so that the position of the beam with respect to the hanger bracket is selectively adjustable in a fore-and-aft direction to align an axle mounted to the trailing beam. According to the invention, a drive mechanism is mounted between the hanger bracket and the pivot bolt for incrementally adjusting the position of the pivot bolt in the slot to thereby adjust the beam with respect to the hanger bracket.

In one embodiment, the pivot pin is mounted to at least one pivot arm, the pivot arm is pivotally mounted at one end to the hanger bracket for pivotal movement about an axis spaced from the adjustment slot and the drive mechanism is mounted to the at least one pivot arm at a location spaced from the adjustment slot and from the axis of the pivot arm. Pivotal movement of the at least one pivot arm selectively adjusts the relative position of the pivot bolt in the adjustment slot.

Preferably, the drive mechanism further comprises a drive shaft connected to the at least one pivot arm to adjustably move the pivot arm as the shaft is driven. In one embodiment, the drive shaft is journaled in the hanger bracket and is threadably mounted to the at least one pivot arm. Further, in a preferred embodiment, the drive shaft is mounted to the at least one pivot arm through a yoke that has a threaded aperture in which the drive shaft is received. Typically, the longitudinal axis of the shaft is orthogonal to the axis of the at least one pivot arm.

In a preferred embodiment, the hanger bracket has a pair of spaced side walls and an end wall joining the side walls. There are two pivot arms, one adjacent to each side wall of the hanger bracket and the drive shaft is journaled in the end wall of the hanger bracket.

In a preferred embodiment of the invention, the drive mechanism includes a threaded shaft and rotation of the threaded shaft moves the pivot bolt in the slot. In another embodiment, the drive mechanism includes a linear hydraulic actuator. In still another embodiment, the drive mechanism includes a linear pneumatic actuator. In yet another alternative embodiment, the drive mechanism includes an electrically-powered actuator.

BRIEF DESCRIPTION OF THE DRAWINGS

The invention will be described with reference to the accompanying drawings in which.

DETAILED DESCRIPTION OF THE PREFERRED EMBODIMENTS

Figure 1:
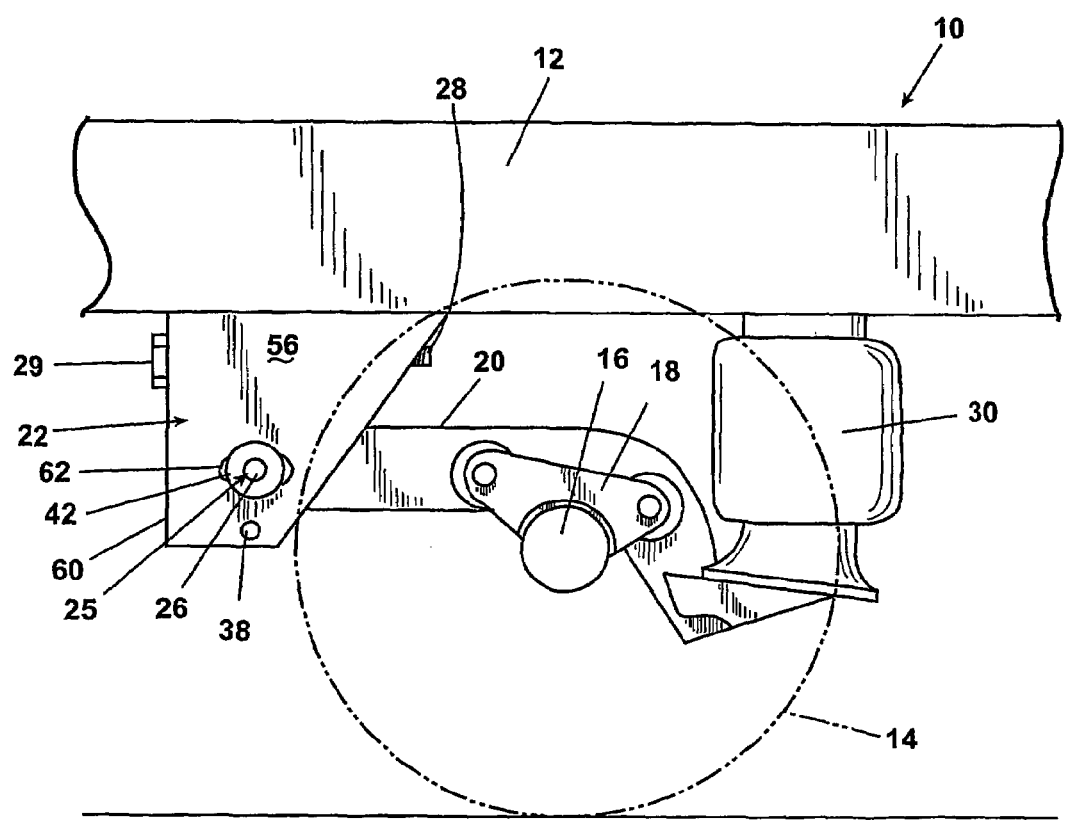
FIG. 1 is a side elevational view of a trailing beam suspension incorporating the present invention.

Referring now to the drawings, and in particular to FIG. 1, there is illustrated a trailing beam suspension system for a vehicle generally identified by the numeral 10. The suspension system comprises a trailing beam 20, a hanger bracket 22, and an air spring 30. The hanger bracket 22 is attached in a conventional manner to a vehicle frame rail 12. A first end of the trailing beam 20 is pivotally mounted to the hanger bracket 22 through a pivot bolt 26 and a conventional bushed connection (not shown) in the same manner as the trailing arm 22 is pivotally mounted to the bolt 34 in the Strader et al. U.S. Pat. No. 3,960,388. A second end of the trailing beam 20 is attached in a conventional manner to the air spring 30 so that the air spring 30 is disposed in load transmitting relation between the trailing beam 20 and the frame rail 12. An axle 16, with attached wheels 14, is connected to the trailing beam 20 by an axle bracket 18.

Figure 2:
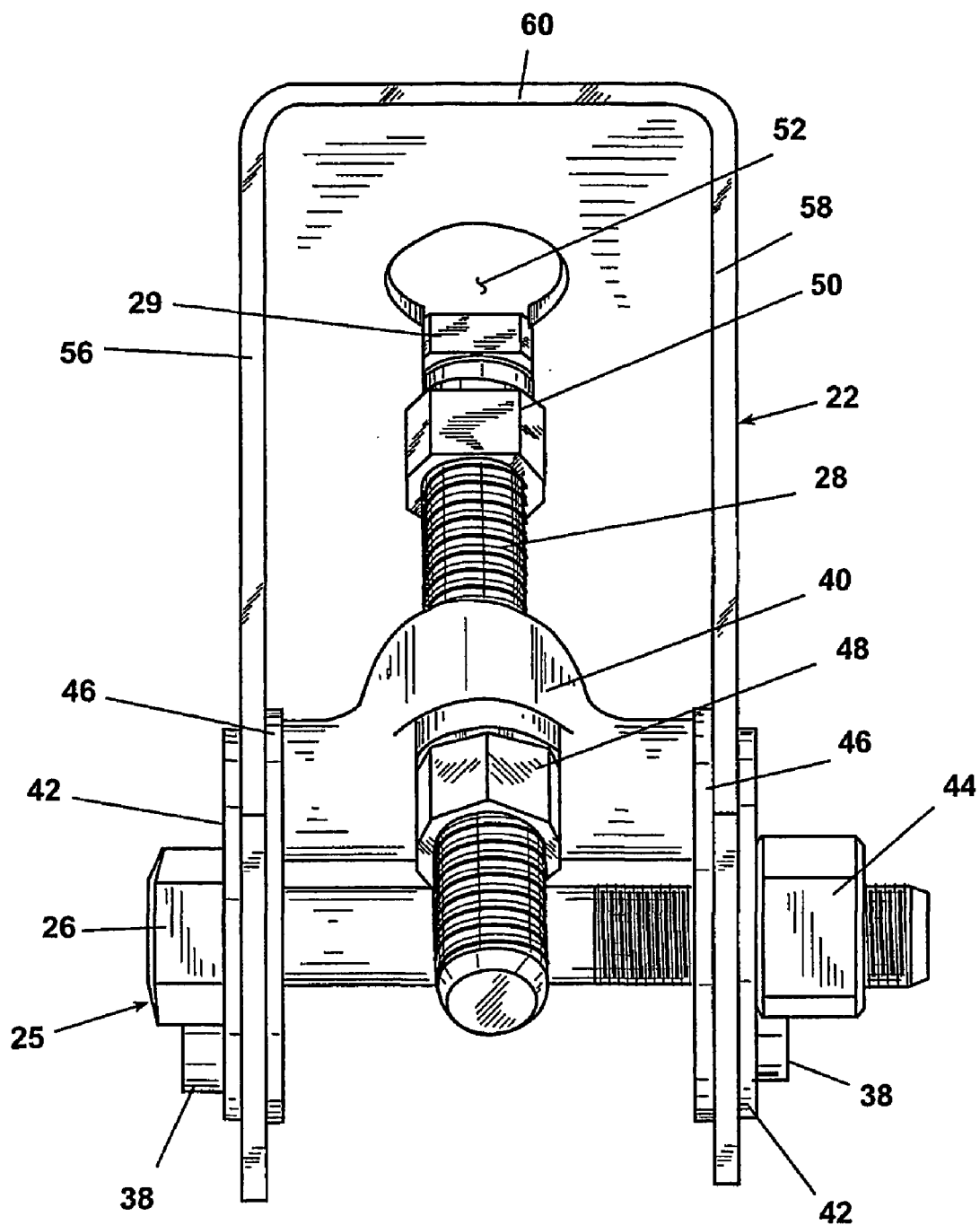
FIG. 2 is a top perspective view of a preferred embodiment of the trailing beam suspension of FIG. 1 showing a yoke assembly installed in a hanger bracket and a trailing beam pivot connection.
Figure 3:
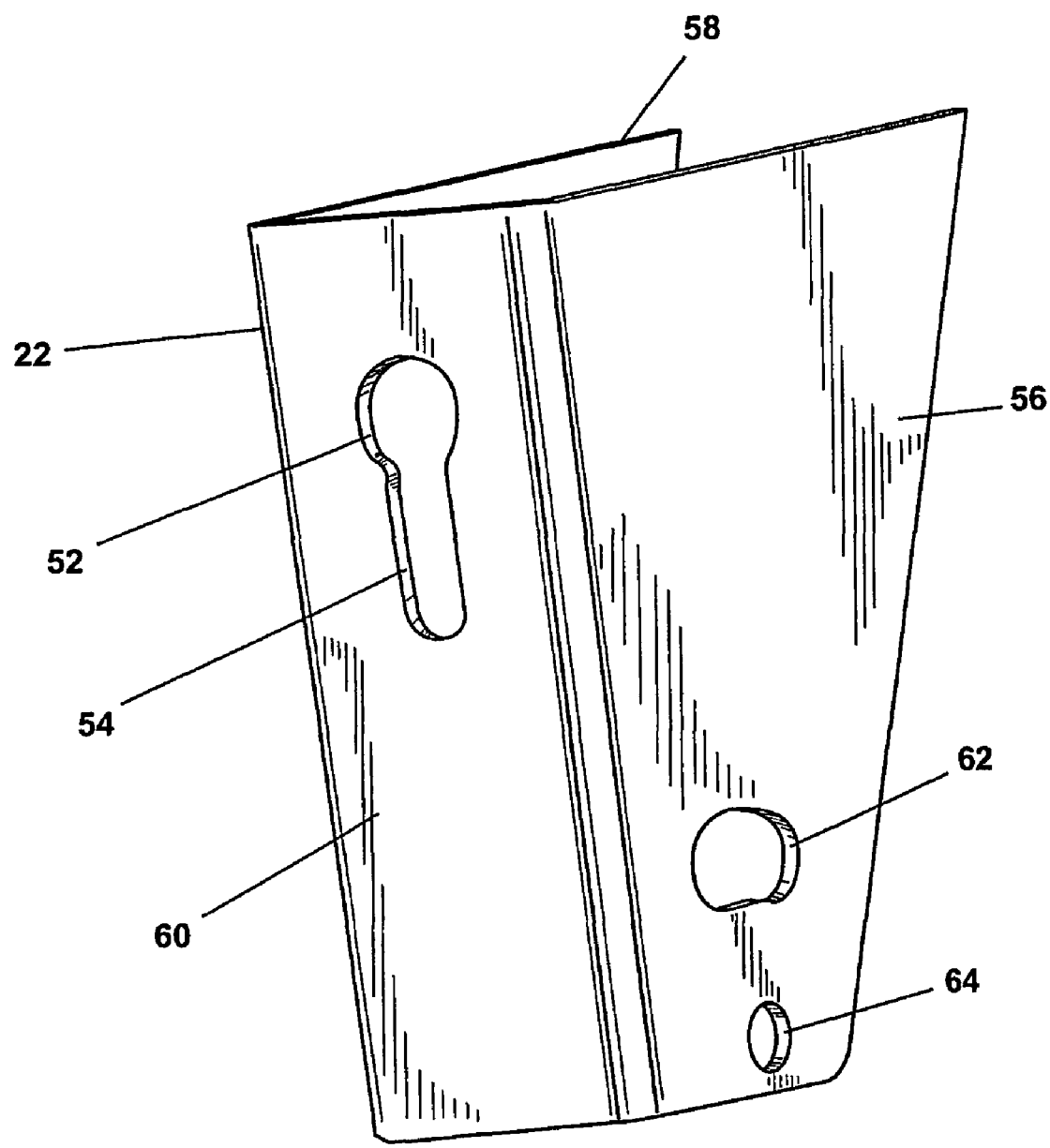
FIG. 3 is a perspective view of the hanger bracket illustrated in FIG. 2.

Referring now to FIGS. 2–6, a preferred embodiment of an alignment mechanism generally comprises the hanger bracket 22, a pivot pin 25 comprising a threaded pivot bolt 26 with a complementary nut 44, an adjustable yoke assembly 39, and two pivot arms 46 with attached pivot studs 38. The hanger bracket has two parallel, laterally spaced-apart sides comprising a first side 56 and a second side 58 joined by an intermediate side 60 generally orthogonal thereto. Washers 42 are spaced between the outer faces of the hanger bracket sides 56, 58, and the head of the pivot bolt 26 and nut 44, respectively. Referring specifically to FIG. 3, the first and second sides 56, 58 of the hanger bracket 22 contain arcuate slots 62 in complementary alignment located at a lower portion of the hanger bracket 22. The arcuate slots 62 are elongate in a direction longitudinal of the trailing beam 20, and upwardly concave. The first and second sides 56, 58 of the hanger bracket 22 also contain pivot apertures 64 in complementary alignment, which are located vertically beneath the arcuate slots 62 proximate to the lower edge of the hanger bracket 22. The arcuate slots 62 slidably receive the pivot bolt 26 and to allow the pivot bolt 26 to laterally translate therein. The pivot apertures 64 slidably receive the pivot studs 38 and to allow rotation of the pivot studs 38 therein. In the embodiment described herein, the upper portion of the intermediate side 60 contains an adjustment bolt aperture 52 and a slot 54 extending generally downwardly from the adjustment bolt aperture 52. The slot 54 accommodates the shaft of an adjustment bolt 28 to enable the adjustment bolt 28 to be freely turned therein.

Figure 4:
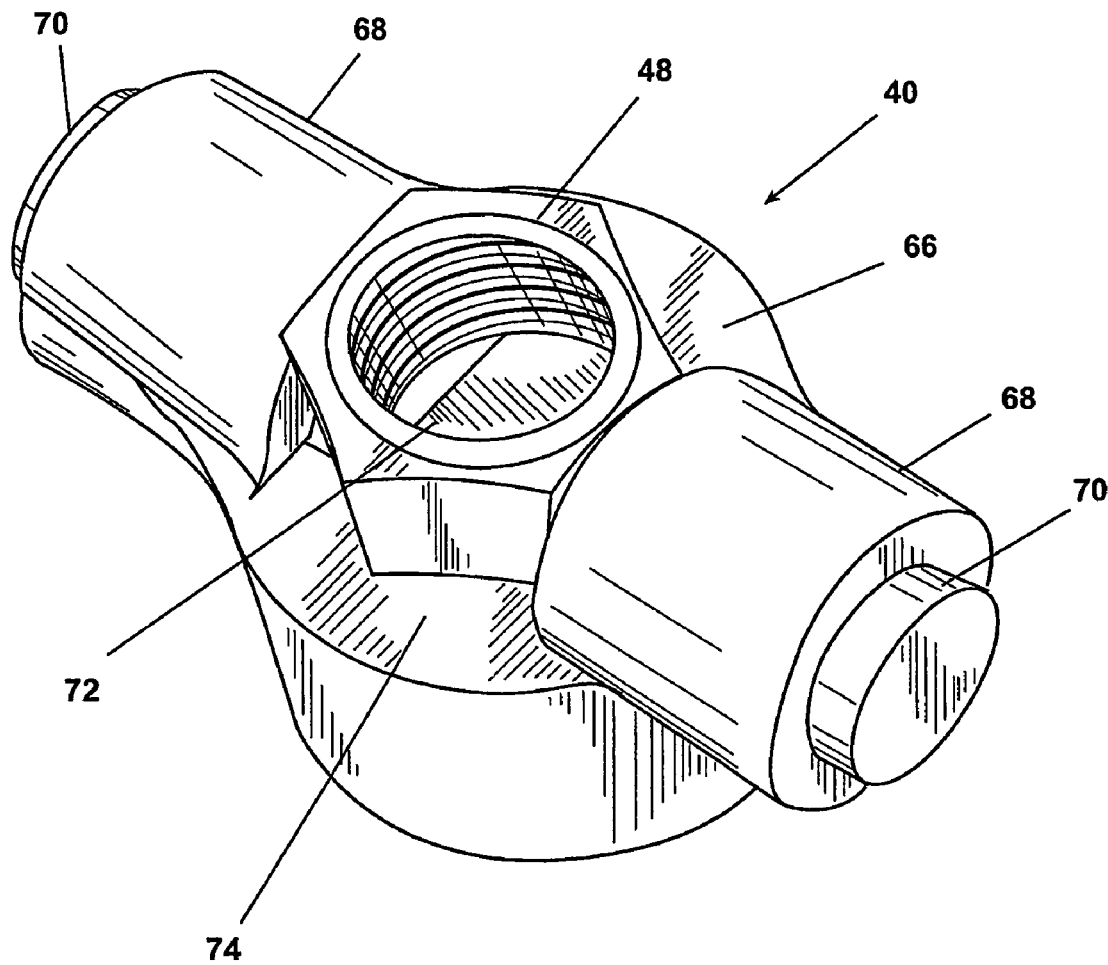
FIG. 4 is a perspective view of a portion of the yoke assembly illustrated in FIG. 2.
Figure 6:
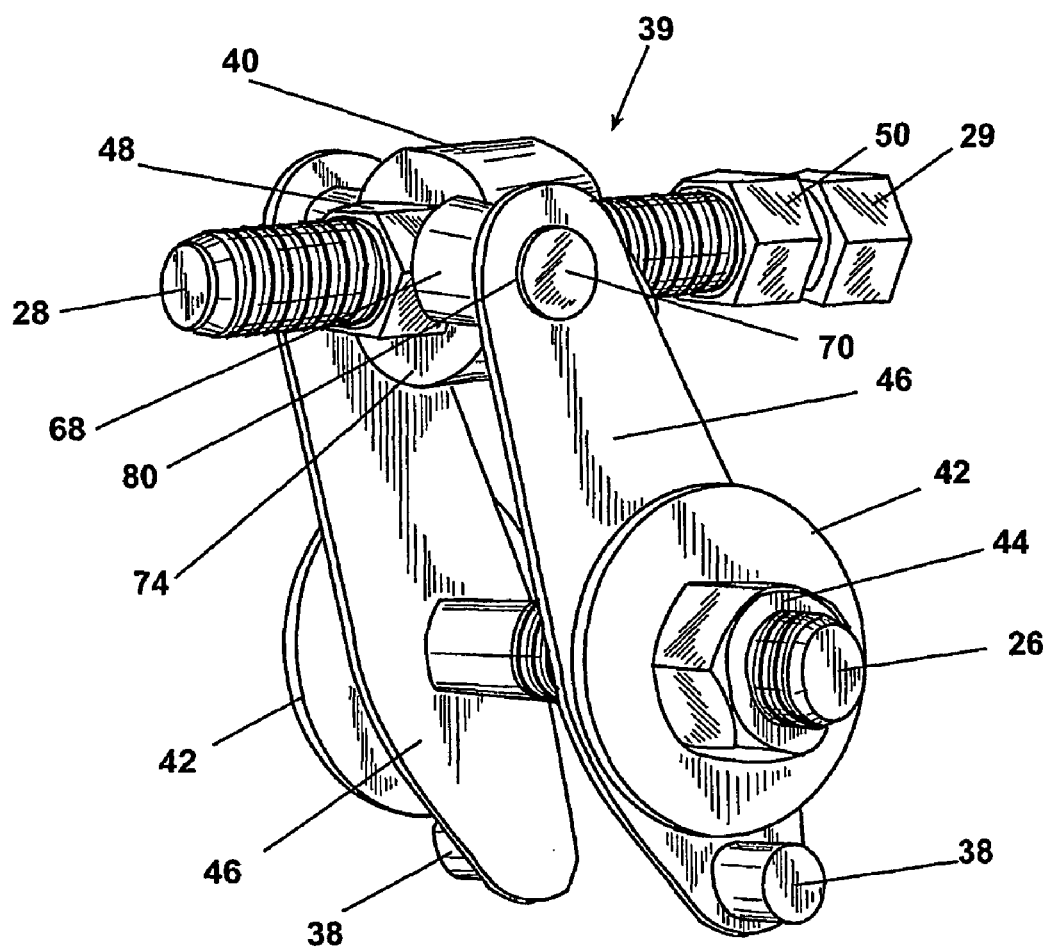
FIG. 6 is a side perspective view of a subassembly consisting of the yoke assembly, pivot arms, and pivot bolt illustrated in FIG. 2.

FIGS. 2, 4 and 6 show the yoke assembly 39 of the preferred embodiment comprising the adjustment bolt 28 with a bolt head 29, a retainer nut 50, a yoke 40 having a threaded yoke aperture 72, and a yoke nut 48. As hereinafter described, turning of the adjustment bolt 28 in the yoke aperture 72 translates the yoke 40 to pivot the pivot arms 46 about the pivot studs 38. Alternate assemblies for urging the pivot arms 46 to pivot about the pivot studs 38 can be employed, such as a linear hydraulic, linear pneumatic, or electrically-powered actuator. For example, a linear hydraulic actuator can have a hydraulic piston with a piston rod attached to the pivot arms 46 through an articulating connection so that extension and retraction of the hydraulic piston and piston rod pivots the pivot arms 46 fore and aft.

In the embodiment shown in FIGS. 2, 4 and 6, the retainer nut 50 is threaded onto the adjustment bolt 28 until it is proximate to the bolt head 29, leaving a gap between the retainer nut 50 and bolt head 29 that is slightly larger than the thickness of the intermediate side 60. The retainer nut 50 is fixedly attached to the adjustment bolt 28, such as by welding or brazing. The yoke 40 comprises a hub 66, opposing arms 68, and a yoke aperture 72. The hub 66 is generally cylindrical and contains the yoke aperture 72 extending axially therethrough. Extending radially from the hub 66 are the diametrically opposed arms 68. The arms 68 are generally cylindrical, axially aligned, and terminate in a pair of spaced-apart axially-opposed yoke studs 70. The yoke stud 70 is a cylindrical projection with a diameter that is smaller than the arm diameter and which is axially aligned with the arm 68. The length of the yoke stud 70 is slightly less than the thickness of the pivot arm 46. A recess 74 extends across the center portion of the hub 66 intermediate the arms 68. The recess 74 accommodates the yoke nut 48 to restrain the yoke nut 48 against rotation relative to the yoke 40. The yoke nut 48 is axially aligned with the yoke aperture 72 and is fixedly attached to the yoke 40, such as by welding or brazing. The yoke 40 and yoke nut 48 can be threaded onto the adjustment bolt 28 by first passing the adjustment bolt 28 through the yoke aperture 72 and into the yoke nut 48.

Figure 5:
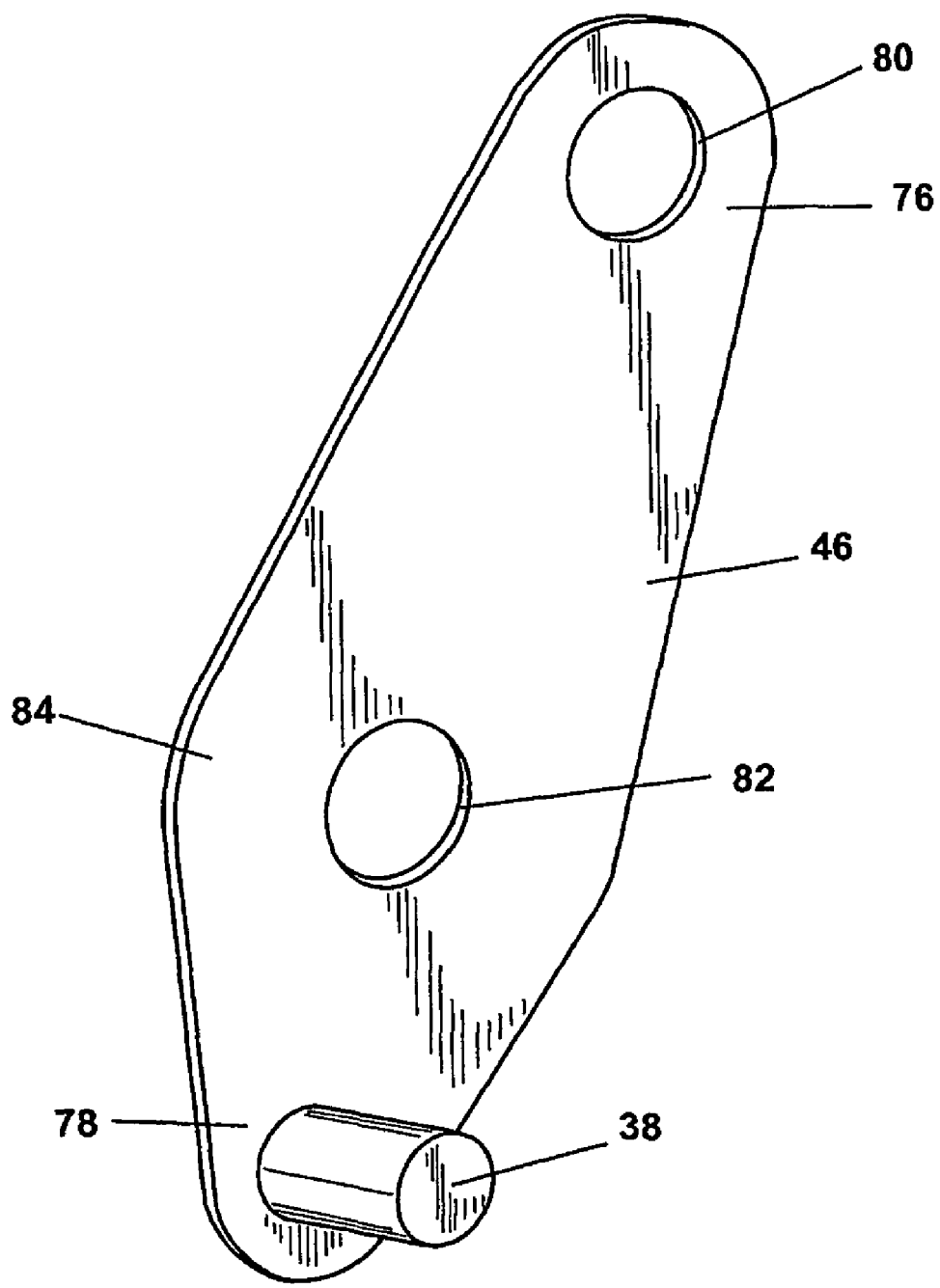
FIG. 5 is a perspective view of a pivot arm illustrated in FIG. 2.

Referring now to FIG. 5, the pivot arm 46 is a generally plate-like elongated member with a central portion 84 that tapers to a first end 76 and to a second end 78. The central portion 84 contains a pivot bolt aperture 82 centered with respect to the longitudinal axis of the pivot arm 46. The first end 76 contains a shaft receptacle 80 centered with respect to the longitudinal axis of the pivot arm 46. The second end 78 has a pivot stud 38 extending orthogonally therefrom and centered with respect to the longitudinal axis of the pivot arm 46. The shaft receptacle 80 slidably receives the yoke stud 70. The pivot bolt aperture 82 slidably receives the pivot bolt 26. The pivot stud 38 is slidably received within the pivot aperture 64. The length of the pivot stud 38 is slightly greater than the thickness of a hanger bracket side 56, 58.

Figure 7:
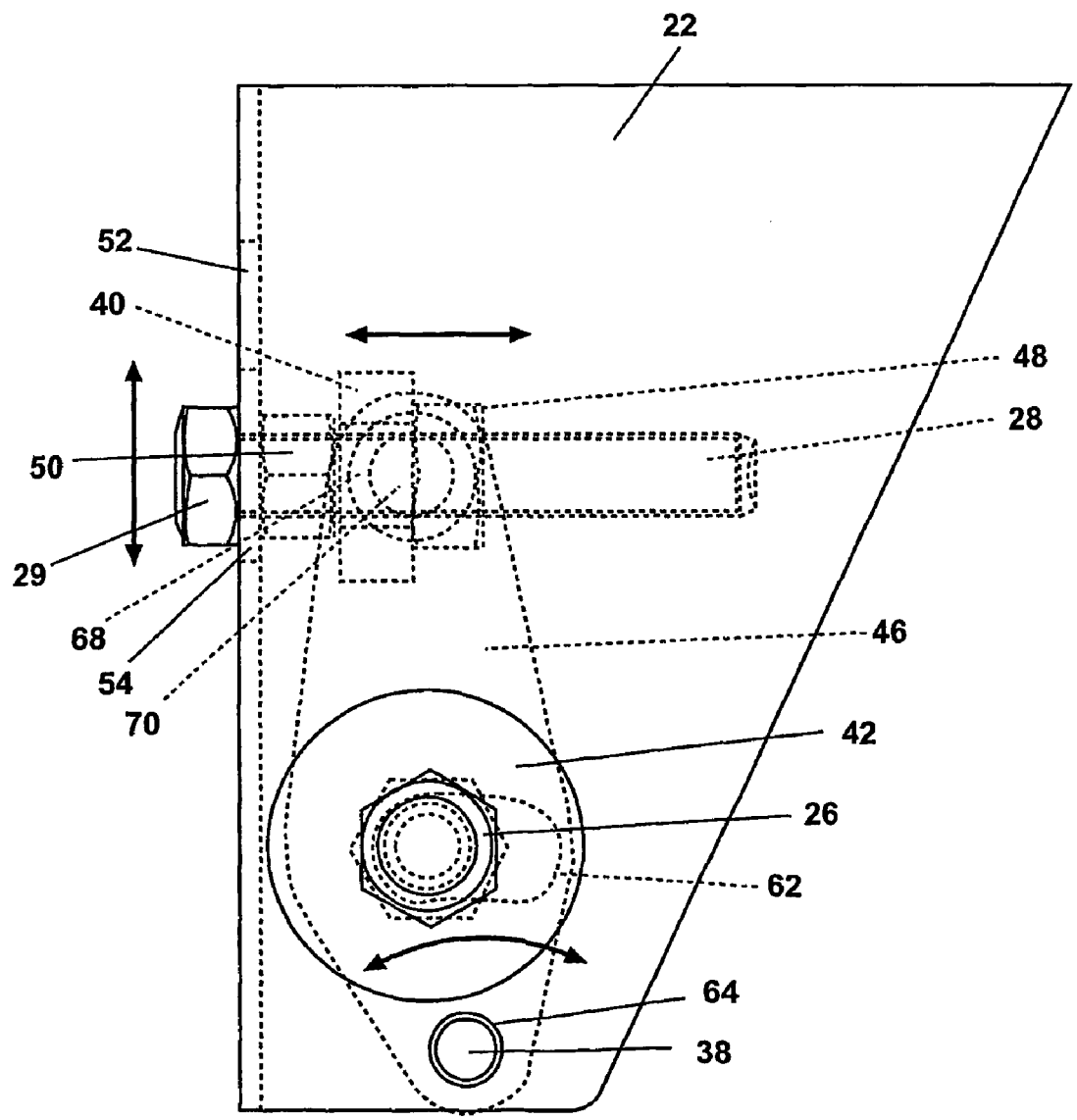
FIG. 7 is a side view of the subassembly of FIG. 6 installed in the hanger bracket and illustrating the relative movement of the components of the alignment mechanism as the device is operated.

Referring now to FIGS. 6 and 7, the assembly and operation of the invention will be described. The adjustment bolt 28 is inserted through the yoke aperture and threaded into the yoke nut 48. The yoke studs 70 are inserted into the shaft receptacles 80 through the pivot arms 46, enabling each pivot arm 46 to pivot about its respective yoke stud 70. The pivot studs 38 are inserted into the pivot apertures 64 in the hanger bracket sides 56, 58, enabling the pivot arms 46 to pivot about the pivot studs 38. The adjustment bolt head 29 is passed through the adjustment bolt aperture 52, and the adjustment bolt 28 is positioned in the slot 54 so that the bolt head 29 is to the outside of the intermediate side 60 and the retainer nut 50 is to the inside of the intermediate side 60. The adjustment bolt 28 can be turned freely in the slot 54 and is restrained against axial movement by the bolt head 29 and retainer nut 50. Furthermore, the adjustment bolt 28 can move vertically within the slot 54 during the adjustment process.

The pivot bolt apertures 82 are also aligned with the arcuate slots 62. The pivot bolt 26 is inserted through a washer 42, a pivot bolt aperture 82, an arcuate slot 62, the bushed connection (not shown) of the trailing beam, the second arcuate slot 62, the second pivot bolt aperture 82, the second washer 42, and threaded into the nut 44 to pivotally connect the trailing beam to the hanger bracket 22. As assembled, each pivot arm 46 is in slidable contact with the inside face of its respective hanger bracket side 56, 58.

After the alignment subassembly has been assembled in the hanger bracket 22 with the trailing beam 20 mounted to the pivot bolt 26 as described above, the alignment of the trailing beam is accomplished as follows. The pivot bolt 26 and nut 44 are in a slightly loosened configuration. The adjustment bolt 28 is rotated, which draws the yoke assembly 39 fore or aft, depending upon the direction of rotation of the adjustment bolt 28. Movement of the yoke assembly 39 pivots the pivot arm 46 about the pivot stud 38. This moves the pivot bolt 26 along the arcuate slots 62 in a corresponding fore or aft direction, which correspondingly moves the trailing beam 20 in a fore or aft direction. This process is continued until the axle 16 and wheels 14 are properly aligned with the vehicle frame 12. When the axle 16 and wheels 14 are in the desired alignment, the nut 44 is tightened to secure the bushed connection to the hanger bracket 22.

The trailing beam 20, the axle 16, and the wheels 14 can be easily and accurately aligned due to the unique mechanism. Additionally, the pivot bolt nut 44 can be securely tightened to the proper torque without the risk that the trailing beam 20 will become misaligned during the tightening process. Tightening the pivot bolt nut 44 to the prior torque reduces the risk that the nut 44 will loosen over time and the pivot connection will fail due to under-torquing of the nut 44. Additionally, the pivot bolt 26 is securely restrained against lateral movement in the slots 62 unless the adjustment bolt 28 is turned. The unique alignment mechanism thus provides further protection against misalignment of the trailing beam 20, axle 16, and wheels 14 due to impact or shock loads imposed on the suspension by potholes or other road surface irregularities. The trailing beam 20, axle 16, and wheels 14 will remain in the properly aligned position even if the nut 44 becomes loosened. Furthermore, the alignment of the trailing beam 20 can be maintained without the necessity of welding the alignment components to the hanger bracket or vehicle frame, thus facilitating future adjustment to the wheel alignment.

Figure 8:
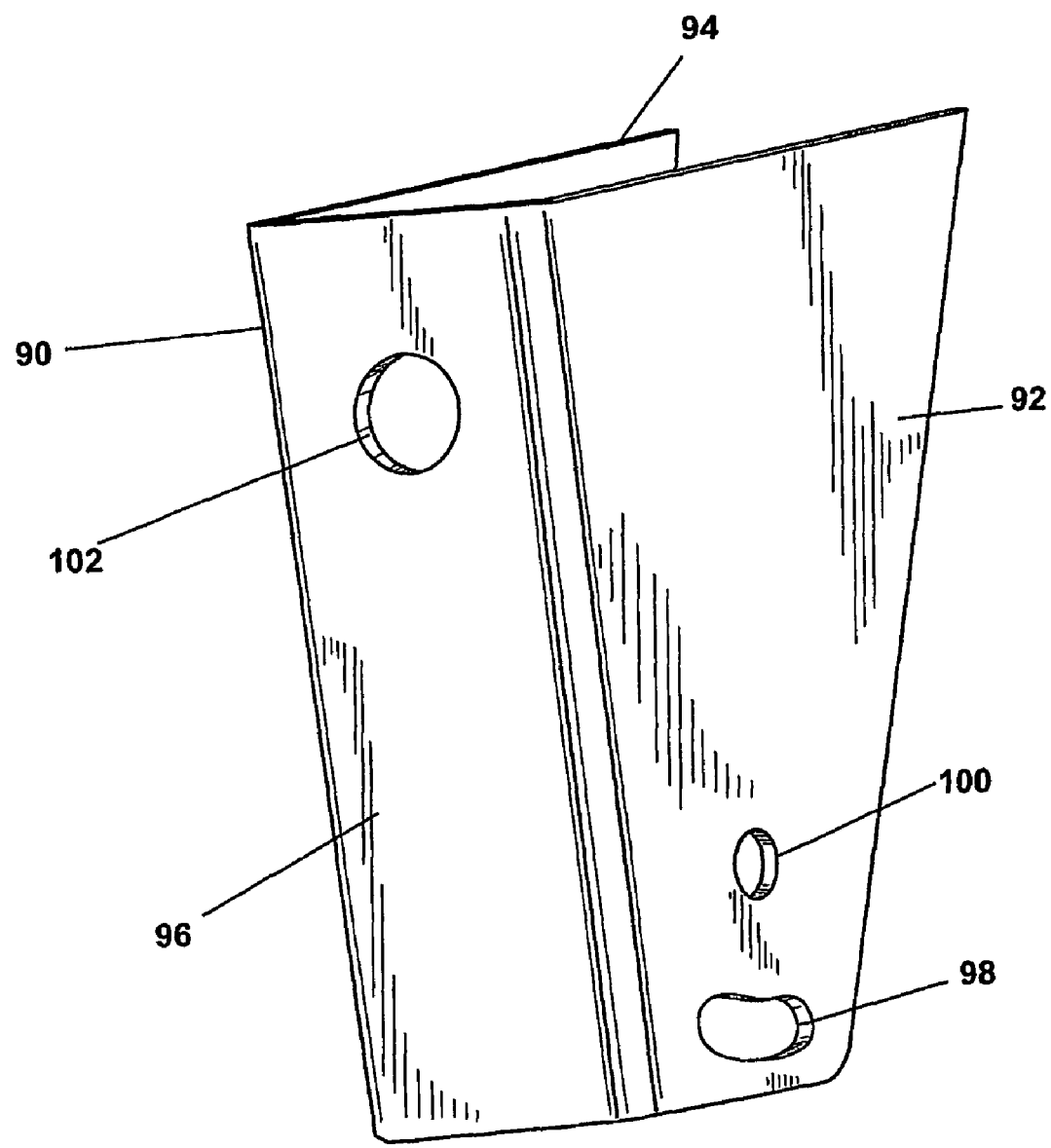
FIG. 8 is a perspective view of a hanger bracket comprising part of an alternate embodiment of the trailing beam suspension of FIG. 1.

An alternate embodiment of the invention comprises a hanger bracket with alternate arcuate slots and pivot apertures which is generally similar to the hanger bracket 22, except as hereinafter described. FIG. 8 shows a hanger bracket 90 with arcuate slots 98 in complementary alignment located at a lower portion of first and second sides 92, 94 of the hanger bracket 90, elongate in a direction longitudinal of the trailing beam 20, and downwardly concave. The first and second sides 92, 94 also contain pivot apertures 100 in complementary alignment, which are located vertically above the arcuate slots 98. An intermediate wall 96 is shown comprising a mounting aperture 102 at an upper portion thereof for mounting a linear actuator, such as a hydraulic or pneumatic ram (not shown). Alternatively, the intermediate wall 96 can comprise an adjustment bolt aperture and a slot similar to the previously described adjustment bolt aperture 52 and slot 54 to accommodate an adjustment assembly comprising the previously described adjustment bolt 28.

Figure 9:
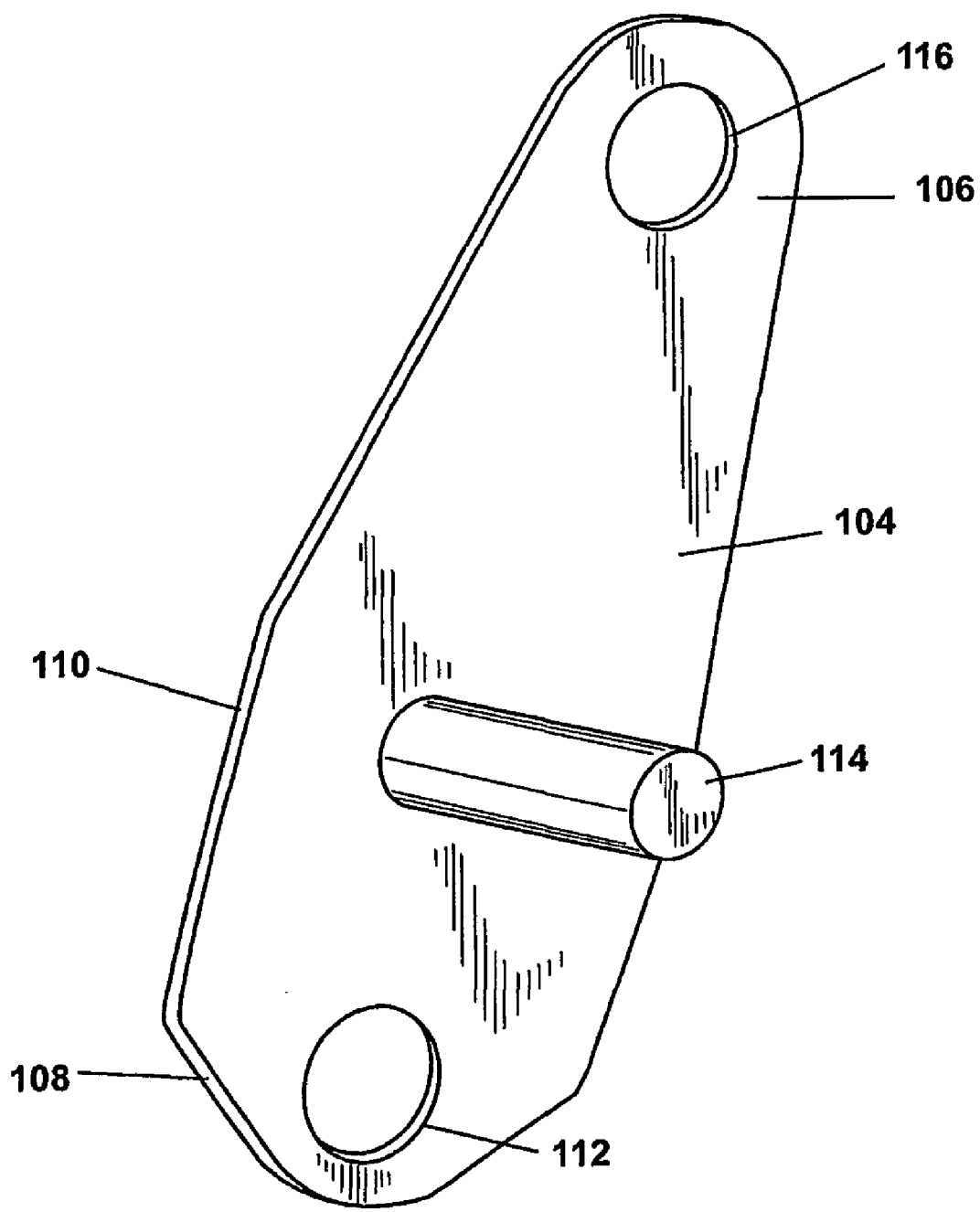
FIG. 9 is a perspective view of a pivot arm which is complementary to the hanger bracket illustrated in FIG. 8.

FIG. 9 shows an alternate pivot arm 104 complementary to the hanger bracket 90 of FIG. 8. The pivot arm 104 is a generally plate-like elongated member with a pivot portion 110 that tapers to a yoke end 106 and transitions to a trailing beam end 108. The pivot portion 110 contains a pivot stud 114 extending orthogonally therefrom and centered with respect to the longitudinal axis of the pivot arm 104. The yoke end 106 contains a shaft receptacle 116 centered with respect to the longitudinal axis of the pivot arm 104. The trailing beam end 108 has a pivot bolt aperture 112 centered with respect to the longitudinal axis of the pivot arm 104. The shaft receptacle 116 slidably receives the yoke stud 70. The pivot bolt aperture 112 slidably receives the pivot bolt 26. The pivot stud 114 is slidably received within the pivot aperture 100. The length of the pivot stud 114 is slightly greater than the thickness of a hanger bracket side 92, 94.

The adjustment of the trailing arm alignment for the alternate embodiment is similar to the adjustment of the previously described preferred embodiment. The adjustment bolt 28 is rotated, which draws the yoke assembly 39 fore and aft, depending upon the direction of rotation of the adjustment bolt 28. Movement of the yoke assembly 39 pivots the pivot arms 104 about the pivot stud 114. This moves the pivot bolt 26 along the arcuate slots 98 in an opposed fore-and-aft direction, which correspondingly moves the trailing beam 20 in a fore and aft direction. This process is continued until the axle 16 and wheels 14 are properly aligned with the vehicle frame 12. When the axle 16 and wheels 14 are in the desired alignment, the nut 44 is tightened to secure the bushed connection to the hanger bracket 22. It will be readily apparent to one of ordinary skill in the art that, if the distance between the pivot stud 114 and the shaft receptacle 116 is less than the distance between the pivot stud 114 and the pivot bolt aperture 112, the translational movement of the yoke assembly 39 will impart a proportionately greater translational movement to the pivot bolt 26, thereby providing a greater degree of adjustability than with the previously described preferred embodiment.

While the configuration and operation of the invention has been described with respect to embodiments comprising an adjustment bolt 28 and complementary yoke assembly 39, other embodiments capable of linear motion for translating a yoke assembly and providing fore-and-aft pivotable adjustment consistent with the inventive concepts described herein, such as a linear hydraulic, linear pneumatic, or electrically-powered actuator, can be utilized.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The invention claimed is:

1. In a trailing beam suspension for a vehicle comprising a hanger bracket adapted to be mounted to a vehicle frame rail, a trailing beam pivotally mounted at one end to the hanger bracket through a pivot bolt and an adjustment slot in the hanger bracket so that the position of the beam with respect to the hanger bracket is selectively adjustable in a fore-and-aft direction to align an axle mounted to the trailing beam, the improvement comprising:

a manually adjustable, threadably actuated drive mechanism mounted between the hanger bracket and the pivot bolt for incrementally adjusting the position of the pivot bolt in the slot to thereby adjust the beam with respect to the hanger bracket, wherein the drive mechanism includes a drive shaft that is substantially orthogonal to an axis of the pivot bolt and is substantially offset therefrom;

the pivot bolt is mounted to at least one pivot arm, the at least one pivot arm is pivotally mounted at one end to the hanger bracket for pivotal movement about an axis spaced from the adjustment slot and the drive mechanism is mounted to the at least one pivot arm at a location spaced from the adjustment slot and from the axis of the at least one pivot arm, whereby pivotal movement of the at least one pivot arm selectively adjusts the relative position of the pivot bolt in the adjustment slot; and the drive shaft is connected to the at least one pivot arm to adjustably move the at least one pivot arm as the shaft is driven wherein the drive shaft is journaled in the hanger bracket and is threadably mounted to the at least one pivot arm through a yoke wherein the drive shaft is journaled in the hanger bracket and is threadably mounted to the at least one pivot arm through a yoke.

2. The trailing beam suspension according to claim 1 wherein the drive shaft is a threaded shaft.

3. The trailing beam suspension according to claim 2 wherein rotation of the threaded shaft moves the pivot bolt in the slot.

4. The trailing beam suspension according to claim 1 wherein the drive mechanism symmetrically engages the pivot bolt.

5. In a trailing beam suspension for a vehicle comprising a hanger bracket adapted to be mounted to a vehicle frame rail, a trailing beam pivotally mounted at one end to the hanger bracket through a pivot bolt and an adjustment slot in the hanger bracket so that the position of the beam with respect to the hanger bracket is selectively adjustable in a fore-and-aft direction to align an axle mounted to the trailing beam, the improvement comprising:

a drive mechanism mounted between the hanger bracket and the pivot bolt for incrementally adjusting the position of the pivot bolt in the slot to thereby adjust the beam with respect to the hanger bracket, wherein the pivot bolt is mounted to at least one pivot arm, the at least one pivot arm is pivotally mounted at one end to the hanger bracket for pivotal movement about an axis spaced from the adjustment slot and the drive mechanism is mounted to the at least one pivot arm at a location spaced from the adjustment slot and from the axis of the pivot arm, whereby pivotal movement of the at least one pivot arm selectively adjusts the relative position of the pivot bolt in the adjustment slot, the drive mechanism further comprising a drive shaft connected to the at least one pivot arm to adjustably move the pivot arm as the shaft is driven, and wherein the drive shaft being journaled in the hanger bracket and is threadably mounted to the at least one pivot arm through a yoke that has a threaded aperture in which the drive shaft is received.

6. The trailing beam suspension according to claim 5 wherein the longitudinal axis of the shaft is orthogonal to the axis of the at least one pivot arm.

7. The trailing beam suspension according to claim 6 wherein the hanger bracket has a pair of spaced side walls and an end wall joining the side walls, and there are two pivot arms, one adjacent to each side wall of the hanger bracket and the drive shaft is journaled in the end wall.

8. The trailing beam suspension according to claim 7 wherein the shaft is substantially centrally located between the side walls of the hanger bracket.

* * * * *